C. WORTHINGTON.
TRANSPORTATION SYSTEM.
APPLICATION FILED NOV. 9, 1908.
936,395.
Patented Oct. 12, 1909.
2 SHEETS—SHEET 1.
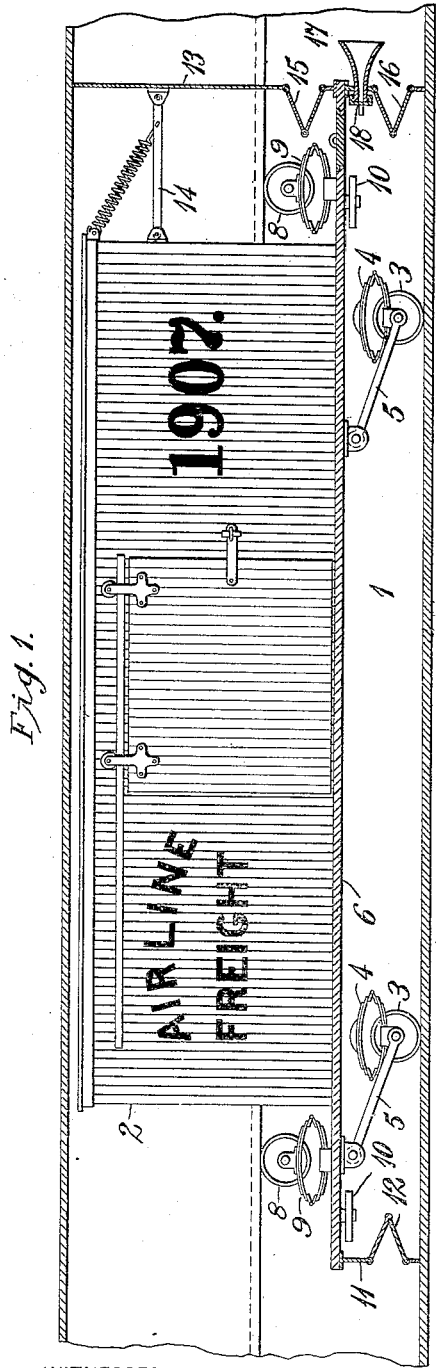
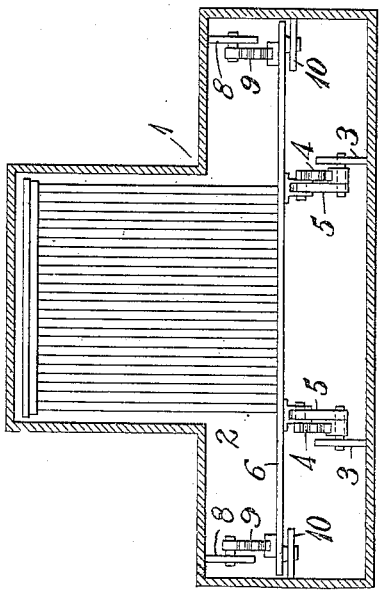
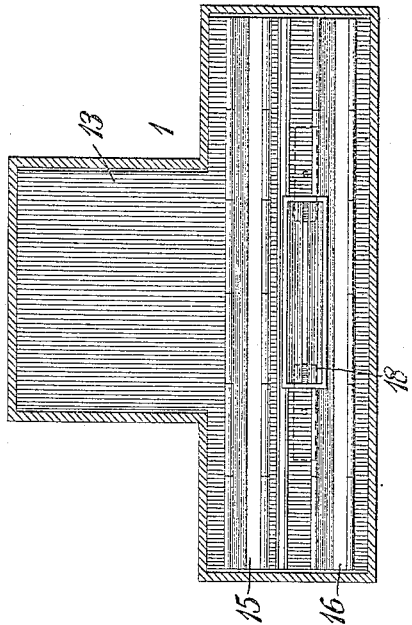
WITNESSES:
Fred H. Miller
R. J. Dearborn
INVENTOR
Charles Worthington
BY
Wesley G. Carr
ATTORNEY C. WORTHINGTON.
TRANSPORTATION SYSTEM.
APPLICATION FILED NOV. 9, 1908.
936,395.
Patented Oct. 12, 1909.
2 SHEETS—SHEET 2.
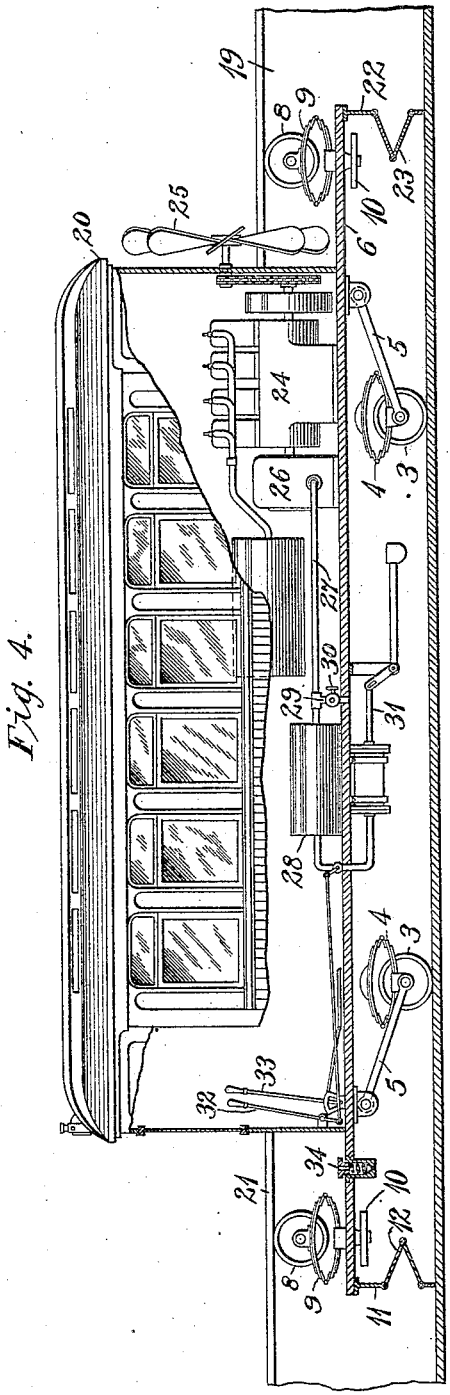
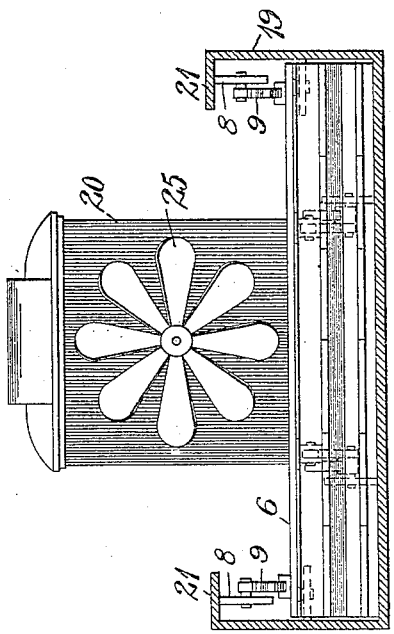
WITNESSES:
Fred H. Miller
R. J. Dearborn
INVENTOR
Charles Worthington
BY
Wesley G. Carr
ATTORNEY

UNITED STATES PATENT OFFICE.

CHARLES WORTHINGTON, OF NEW YORK, N. Y.

TRANSPORTATION SYSTEM.

936,395.  Specification of Letters Patent.  Patented Oct. 12, 1909.

Application filed November 9, 1908.  Serial No. 461,653.

*To all whom it may concern:*

Be it known that I, CHARLES WORTHINGTON, a citizen of the United States, and a resident of New York city, in the county of New York and State of New York, have invented a new and useful Improvement in Transportation Systems, of which the following is a specification.

My invention relates to systems utilized for transporting passengers, express and light freight matter from place to place, and it has for its object to provide a vehicle so constructed and combined with a conduit that the vehicle may be propelled and at the same time supported by compressed air; or, if propelled by other means, may be so supported pneumatically as to substantially eliminate the friction which is incident to the operation of traction vehicles.

In the accompanying drawings, Figure 1 is a view, partially in side elevation and partially in section, of a conduit and a vehicle embodying one form of my invention. Fig. 2 is a transverse section through the conduit, showing the vehicle in end elevation. Fig. 3 is a view corresponding to Fig. 2 but showing the vehicle with the end shield or plate removed. Fig. 4 is a view corresponding to Fig. 1 but illustrating a modification of my invention, and Fig. 5 is a view corresponding to Fig. 2 but showing the modification illustrated in Fig. 4.

It is more or less common practice to transport mail matter and small packages through tubes or conduits by means of small vehicles propelled by compressed air, but, in all such installations with which I am familiar, pneumatic pressure is utilized solely for propelling the vehicles through the conduit.

In all cases where transportation vehicles are utilized for transporting either passengers or freight, the resistance to movement of the vehicles on account of friction is large, and unless utilized for the purpose of increasing the traction of propelling wheels upon the rails, it necessarily involves a large waste of energy.

According to my present invention, I propose to utilize compressed air for supporting vehicles in a conduit, thereby substantially eliminating friction and thus enabling me to propel the vehicles by the expenditure of an amount of power which is only a small percentage of that which has heretofore been necessary.

As illustrated in Figs. 1, 2 and 3, my invention embodies a conduit or tube 1, of any suitable cross-section and to which air may be supplied, under any desired pressure, for the purpose of propelling vehicles therethrough. I have shown in position in the conduit a car 2, the bottom of which is provided with two pairs of wheels 3 the bearing boxes of which are provided with springs 4 upon which the car may be supported when not in motion. The bearing boxes or axles of the wheels are also shown as having hinge connection with the body of the vehicle, by means of bars 5. The specific structure and arrangement of these parts may, of course, be different from what I have shown, these devices being intended merely as supports for the vehicle when at rest and also to act as cushion stops for the vehicle, in case it should be suddenly lowered, through accident or otherwise. The bottom floor 6 of the vehicle is extended beyond the sides and ends of the vehicle body, as shown, the side extensions reaching nearly to the side walls of the conduit. Bearing wheels 8, supported upon springs 9, are provided to engage the upper wall of the conduit when the car is raised and supported by compressed air. Bearing wheels 10 are also provided, having vertical axes and adapted to bear against the side walls of the conduit, in order to prevent frictional engagement of the car with such side walls. Any desired number of the wheels 3, 8 and 10 may be employed, but, ordinarily, four in each set will probably be found sufficient and desirable.

The front end of the plate 6 is provided with a downwardly projecting apron 11, having a flexible portion 12, or some equivalent arrangement, to keep the joint between the car and the bottom of the conduit closed, or as nearly closed as may be practicable, whatever may be the elevation of the plate 6.

The rear end of the car is provided with a plate or apron 13 which extends from side to side and from the top to the bottom of the conduit, so as to constitute a movable partition against which the compressed air may act to propel the vehicle. The bottom portion of the device 13 is attached to and supported by the plate 6, and its upper portion is supported by arms or bars 14 projecting rearwardly from the body of the vehicle. The upper portion of the member 13 has a flexible section 15 and the lower portion has a similar section 16, in order that the device may accommodate itself to the elevation of the vehicle, without interfering with the movement of the latter.

In order to support the vehicle by means of pneumatic pressure, I provide a conduit 17, the opening through which may be adjusted by means of a suitable valve, such as a slide valve 18, indicated in Fig. 2, or otherwise. Of course, any other valve device may be utilized for regulating the pressure in the chamber beneath the vehicle, it being obvious that some means for regulation of the pressure will be desirable on account of the possible variation in the pressure of the air supplied to the conduit and also in the weight carried by the vehicle.

In Figs. 4 and 5, I have shown a conduit 19 having an open top through which the body of the vehicle 20 projects, the conduit having inwardly projecting flange portions 21 at its upper edge, with which the wheels 8 may make engagement, these wheels being like those shown in the previously described modification and being supported on springs 9, which are mounted upon side extensions of the floor plate 6, as in the said modification. The wheels 3, springs 4 and arms or bars 5 provided in this modification are also the same, both structurally and functionally, as in the other form, but in this form an apron 22 having a flexible portion 23, and corresponding in all respects to apron 11 having the flexible portion 12, is attached to the rear end of the floor plate 6, so that a closed, or substantially closed, chamber is provided beneath the vehicle, for compressed air to be utilized in supporting the vehicle as it is propelled through the conduit. In this case, I have shown a gasolene engine 24, such as is ordinarily employed for propelling road vehicles, and have shown, as connected to this engine, at the rear of the vehicle, a propeller 25, the action of which will serve to propel the vehicle when it is pneumatically supported in the conduit. The engine 24 also drives an air compressor 26, which is connected, by means of a pipe 27, with a reservoir 28 and also, through a branch pipe 29, to the chamber beneath the vehicle, a valve 30 being provided in order to regulate the pressure supplied to the chamber. I have shown a braking device 31 adapted to be operated by compressed air received from the reservoir 28 and controlled by a lever 32 at the front end of the vehicle. I have also shown a lever 33, as indicative of means to be used for controlling the engine 24, but, of course, the usual controlling devices may be employed, and as such apparatus is well known, I have not deemed it necessary to illustrate the same in detail. Furthermore, I desire it to be understood that any other device which may be utilized for propelling the vehicle may be employed, the device shown being intended merely as indicative of some practicable agency for effecting the desired result.

Near the front end of the floor plate 6, I have shown a relief valve 34, which may, of course, be so set as to keep the pressure within the supporting chamber at any value which may be desired. Other regulating and controlling devices which it may be found necessary to employ in practice may be utilized, and I therefore have not attempted to show structural details any further than was necessary in order to set forth an operative system. It will be further understood that suitable controlling and braking devices may be utilized in connection with the form shown in Figs. 1, 2 and 3, as well as in connection with the form illustrated in the other figures.

While I have shown and described means for utilizing compressed air for supporting vehicles during transit from place to place, it will be understood by those skilled in the art that the pressure, instead of being greater than atmospheric pressure, may be atmospheric pressure, provided the space above the vehicle be partially exhausted of air. While the utilization of a partial vacuum as indicated would necessitate some re-adjustment and re-arrangement of parts, it would be, in effect, hardly more than a mere reversal of what I have shown, and I therefore desire that such an arrangement be included within the scope of my invention, without specifically illustrating the same.

I claim as my invention:

1. In a transit system, the combination with a conduit, of a car mounted therein and extending from side to side thereof to form an air chamber, and means for maintaining and regulating the pressure in said chamber to insure a desired lifting fluid-pressure upon the car.

2. The combination with a conduit, of means for supplying fluid-pressure thereto, a car mounted to operate in the conduit and combined therewith to form an air chamber, and means for maintaining such pressure in said chamber as to insure a desired lifting fluid-pressure upon the car.

3. The combination with a conduit and a car mounted to operate therein having an upwardly projecting rear shield and a downwardly projecting front shield whereby a driving and a lifting fluid-pressure are exerted upon the car.

4. The combination with a conduit and a vehicle having a substantially horizontal platform the edges of which fit the conduit to form an air chamber, of means for propelling said vehicle and means for maintaining such pressure in said chamber as to insure a desired lifting pressure upon said vehicle.

5. The combination with a conduit, of a vehicle partially located in said conduit and provided with supporting and guiding devices and with means for forming an air chamber between it and the bottom of the conduit, and means for maintaining and regulating the pressure in said chamber to insure a desired lifting pressure upon said vehicle.

6. The combination with a conduit and a substantially horizontal carrying platform the edges of which extend to the walls of the conduit to form an air chamber, of means for maintaining and regulating the pressure in said chamber to insure a desired lifting pressure, and means for propelling said carrying platform through the conduit.

In testimony whereof, I have hereunto subscribed my name this sixth day of November, 1908.

CHAS. WORTHINGTON.

Witnesses:
H. C. THOMPSON,
T. J. THEINHEIMER.